United States Patent [19]

Bell

[11] Patent Number: 5,123,802
[45] Date of Patent: Jun. 23, 1992

[54] MOTORCYCLE WHEEL LIFT ADAPTER KIT

[76] Inventor: Francis C. Bell, 5236 Martin Dr. SE., East Sparta, Ohio 44626

[21] Appl. No.: 571,191

[22] Filed: Aug. 23, 1990

[51] Int. Cl.⁵ .............................................. B60P 3/12
[52] U.S. Cl. ..................... 414/563; 280/402; 224/42.03 B; 414/427
[58] Field of Search .............. 414/563, 426, 427, 428, 414/429, 462, 463; 280/402; 224/42.03 R, 42.03 A, 42.03 B

[56] References Cited

U.S. PATENT DOCUMENTS

| | | |
|---|---|---|
| 3,740,074 | 6/1973 | Coil ..................... 280/402 |
| 3,744,689 | 7/1973 | Kjensmo ............. 224/42.03 B |
| 3,931,903 | 1/1976 | Johnson ................ 414/462 |
| 4,034,873 | 7/1977 | Having ................. 414/563 |
| 4,712,967 | 12/1987 | Farthing ............... 414/563 |
| 4,836,737 | 6/1989 | Holmes et al. ......... 414/563 |

FOREIGN PATENT DOCUMENTS

| | | | |
|---|---|---|---|
| 1027527 | 3/1978 | Canada ............... 224/42.03 B |
| 2608523 | 9/1977 | Fed. Rep. of Germany ...... 414/563 |
| 2829298 | 1/1980 | Fed. Rep. of Germany ...... 414/427 |
| 3510989 | 11/1985 | Fed. Rep. of Germany ...... 280/402 |
| 2428542 | 2/1980 | France .............. 224/42.03 B |
| 438044 | 11/1967 | Switzerland ........... 414/563 |

OTHER PUBLICATIONS

An American Towman Decade of Sales Experience Comes in Handy—p. 26 of American Towman, vol. 13, No. 2 Apr. 1990.
Motorcycle Sling Straps—p. 47 of AW Direct Catalog No. T590.

Primary Examiner—Frank E. Werner
Attorney, Agent, or Firm—Michael Sand Co.

[57] ABSTRACT

An adapter kit for transporting a motorcycle on the cross tube assembly of the wheel lift of a tow vehicle includes a plurality of rigid bars which form a pair of spaced cradles in cooperation with the cross tube assembly for receiving the wheels of the motorcycle therein. Two of the bars are mounted in the existing mounting members of the cross tube assembly. Certain of the other rigid bars are adjustably connected to each other and are adjustably mounted on the other cross tube mounted bars and form the cradles. Flexible straps extend between extended ends of certain of the rigid bars and the motorcycle structure for securing the motorcycle on the cradles in a conventional manner. The bars are readily removable from each other and from the cross tube assembly of the vehicle for storage when not mounted on the wheel lift for transporting a motorcycle.

17 Claims, 6 Drawing Sheets

MOTORCYCLE WHEEL LIFT ADAPTER KIT

BACKGROUND OF THE INVENTION

1. Technical Field

The invention relates to devices enabling a tow vehicle to transport a disabled motorcycle. In particular, the invention relates to an adapter kit for use with the power operated wheel lift on the rear of tow vehicles. More particularly, the invention relates to such an adapter kit which is readily adjustable for accommodating different sizes and configurations of disabled and wrecked motorcycles enabling the motorcycle to be picked up and supported on the wheel lift of the tow vehicle and secured to a cross tube assembly thereof without damaging or marring other portions of the motorcycle.

2. Background Information

It is a difficult task for most tow vehicle operators to satisfactorily and conveniently pickup and transport a motorcycle which is usually disabled or wrecked, without damaging other portions of the motorcycle, and to accommodate the various sizes and configurations of motorcycles presently in use today. This is partly due to the various accessories such as fairings, windshields, luggage racks, storage boxes, etc. which are attached to many of todays motorcycles. In order to transport a disabled motorcycle, many tow truck operators use a separate or special trailer into which the motorcycle is picked up by the vehicle lift cable or wheeled into the back of the trailer if possible, and tied down for transport. Other tow vehicle operators attempt to use the power operated wheel lift which is usually hydraulic or pneumatically operated and extends outwardly from the rear of the vehicle, for picking up and supporting the motorcycle. Some other known prior devices and apparatus consist of brackets which attach the wheels of the motorcycle at spaced locations on the cross tube assembly of the wheel lift, with the upper portion of the motorcycle being supported by the sling attached to the end of the tow vehicle cable for stabilizing the motorcycle. Another prior art device uses a sling arrangement which is attached to the tow vehicle cable, in combination with a bracket which extends outwardly from the rear of the tow vehicle and attaches to the motorcycle. Still another known device consists of a channel-like frame which is attached to the wheel lift, with the motorcycle being wheeled into and along the channel.

Although these prior devices are satisfactory for certain applications, they are unsuitable for many types of motorcycles due to the various sizes of the motorcycle and the accessories mounted on the motorcycle. Furthermore, tow vehicles often pickup wrecked motorcycles in which the wheels may be at various irregular angles with respect to the frame and cannot be straightened at the accident site before transport by the tow vehicle. Thus, these motorcycles cannot be readily supported on existing cross tube assemblies, carrier frames or the like of many tow vehicles. Furthermore, the slings which extend from the cable of the tow vehicle to the motorcycle frame may for certain motorcycles not have sufficient clearance from the various accessories mounted on the frame. Likewise, modern day motorcycles approach a thousand pounds in weight, and thus are extremely difficult, especially if the wheels are damaged, to be manually moved by the vehicle operator even a slight distance, for positioning the motorcycle on these known transport and lift mechanisms.

Furthermore, certain of these prior art motorcycle lift and transport devices are somewhat permanently attached to the rear of the tow vehicle and can be a hinderance when the tow vehicle is used for other types of towing jobs, or the devices are difficult and bulky to transport and time consuming to attach at the pickup site.

Thus, the need exists for a device which can be readily mounted on and removed from the rear of a tow vehicle, in particular for use with the power operated wheel lift thereof, which enables various shapes and sizes of motorcycles to be easily transported, whether the motorcycle is merely disabled or damaged with bent frame members, without damaging or scratching the motorcycle frame and accessories mounted thereon.

SUMMARY OF THE INVENTION

Objectives of the invention include providing a motorcycle adapter kit for use with the power operated wheel lift of a usual tow vehicle which can be easily disassembled and transported in a compact condition, and then mounted on the wheel lift at a motorcycle pickup site by a single tow vehicle operator in a relatively short period of time.

A further objective of the invention is to provide such an adapter kit which is formed of a plurality of rigid bar members, such as hollow box tubes, which are connected with each other and to the cross tube assembly of the wheel lift by quick release pins, and in which the various bar members are readily adjustable with respect to each other to accommodate various sizes and motorcycle frame configurations.

A still further objective of the invention is to provide such an adapter kit consisting of two sets of three rigid bars each, which when assembled, form a pair of spaced cradles in cooperation with the cross tube assembly of the wheel lift, for supporting the spaced wheels of the motorcycle; and in which each of the cradles is adjustable to accommodate the particular size, configuration and condition of the wheels of the motorcycle.

Another objective of the invention is to provide such an adapter kit which requires very little manual movement of the motorcycle at the pickup site, other than positioning the motorcycle in a generally upright position, with the pair of wheel cradles being assembled around the stationary motorcycle, afterwhich a plurality of flexible straps are attached to the upper frame of the motorcycle and are angled outwardly downwardly and attach to the outer portions of the cradles holding the motorcycle in a generally upright position. Next, the power operated wheel lift will raise the motorcycle from the ground with the wheels settling into openings in the spaced cradles, afterwhich the motorcycle is further secured to the cradles by tightening the flexible straps which extend about portions of the vehicle frame to avoid damaging any of the accessories mounted thereon.

Still another objective of the invention is to provide an adapter kit for use with the wheel lift of a tow vehicle for transporting disabled motorcycles, which is of an extremely simple, rugged and inexpensive construction, and which is easily operated by the tow vehicle operator, and which does not require use of the tow cable of the vehicle.

These objectives and advantages are obtained by the improved adapter kit of the invention, the general nature of which may be stated as an adapter kit for attaching to a cross tube of a wheel lift of a tow vehicle for transporting a motorcycle, the general nature of which includes a pair of wheel cradles adapted to be mounted in a spaced relationship on the cross tube for supporting the wheels of a motorcycle therein, each of said cradles having an attachment bar adapted to be secured on the cross tube and project outwardly therefrom, a cross bar mounted on the attachment bar and extending generally orthogonal therefrom toward the other of the cradles and adapted to be generally parallel with the cross tube, and a retainer bar mounted on the cross bar and extending generally parallel with and spaced from the attachment bar and forming an opening in combination with the cross bar and attachment bar for receiving and supporting a wheel of the motorcycle; and securing means for securing an upper frame portion of the motorcycle to the cradles.

BRIEF DESCRIPTION OF THE DRAWINGS

A preferred embodiment of the invention, illustrative of the best mode in which applicant has contemplated applying the principles, is set forth in the following description and is shown in the drawings, and is particularly and distinctly pointed out and set forth in the appended claims.

Similar numerals refer to similar parts throughout the drawings.

DESCRIPTION OF THE PREFERRED EMBODIMENT

Figure 1:
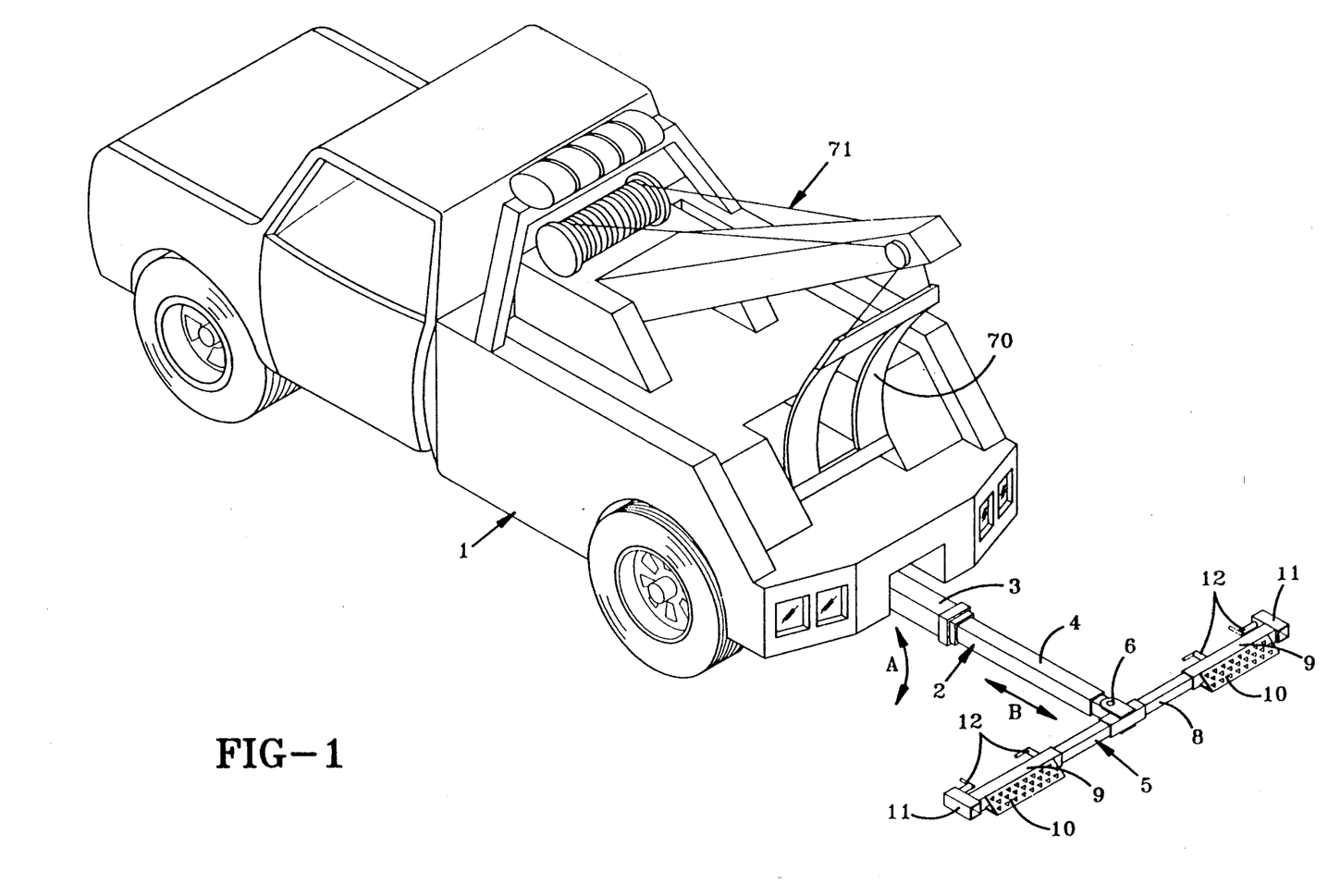
FIG. 1 is a diagrammatic perspective view of a usual tow vehicle having a power operated wheel lift of the type with which the improved adapter kit is intended for use, shown in an outward extended position.

FIG. 1 shows a usual type of tow vehicle 1 having a wheel lift 2 mounted on and extending outwardly from beneath the rear portion of the vehicle. Wheel lift 2 is a device well known in the art and includes a main outer boom 3 which is pivotally mounted beneath the vehicle and is generally moved in an arcuate direction as shown by arrow A, usually by a hydraulic or pneumatic device, or in certain applications could be mechanically operated. A boom extension arm 4 is reciprocally slidably mounted within the hollow interior of boom 3 and is movable in the direction of arrow B by hydraulic or pneumatic means mounted beneath the vehicle, for extending and retracting an outer cross tube assembly 5, which is usually pivotally mounted at 6 to the outer end of extension arm 4.

Cross tube assembly 5 may include an inner cross tube arm 8 with a pair of support arms 9 adjustably mounted on the extended ends of arm 8. An angled plate 10 preferably is secured to the outer ends of each arm 9. A mounting sleeve 11 usually is secured to the end of each support arm 9 and is adapted to receive a usual L-shaped arm (not shown) for capturing the wheel of a vehicle when wheel lift 2 is used in a usual automobile lifting mode. The ends of these L-shaped arms are secured in an adjusted, telescopically received position within mounting sleeves 11, by a quick release locking pin 12.

The features described above with respect to tow vehicle 1 and wheel lift 2 are components well known in the art and form no particular novel feature of the invention and may be modified somewhat from that shown in the drawings without affecting the concept of the invention.

The improved adapter kit of the invention indicated generally at 15, is shown in the remaining figures of the drawings, and is adapted to be used with a type of wheel lift such as shown in FIG. 1.

Figure 2:
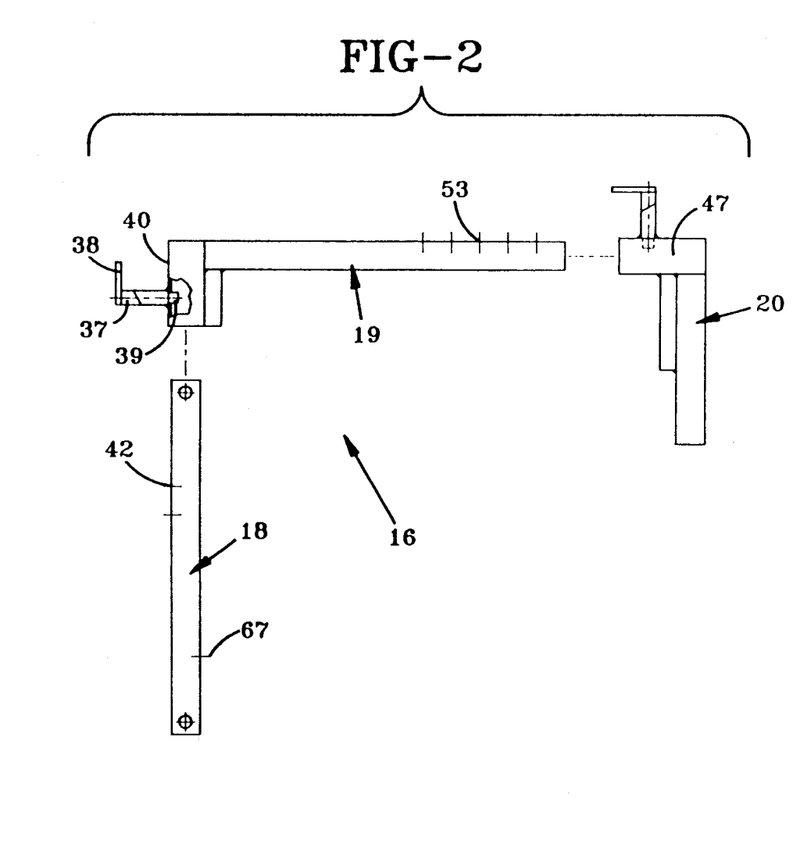
FIG. 2 is a top plan view of the three rigid bars in an unassembled condition, which form the cradle for the rear wheel of the motorcycle.
Figure 2A:
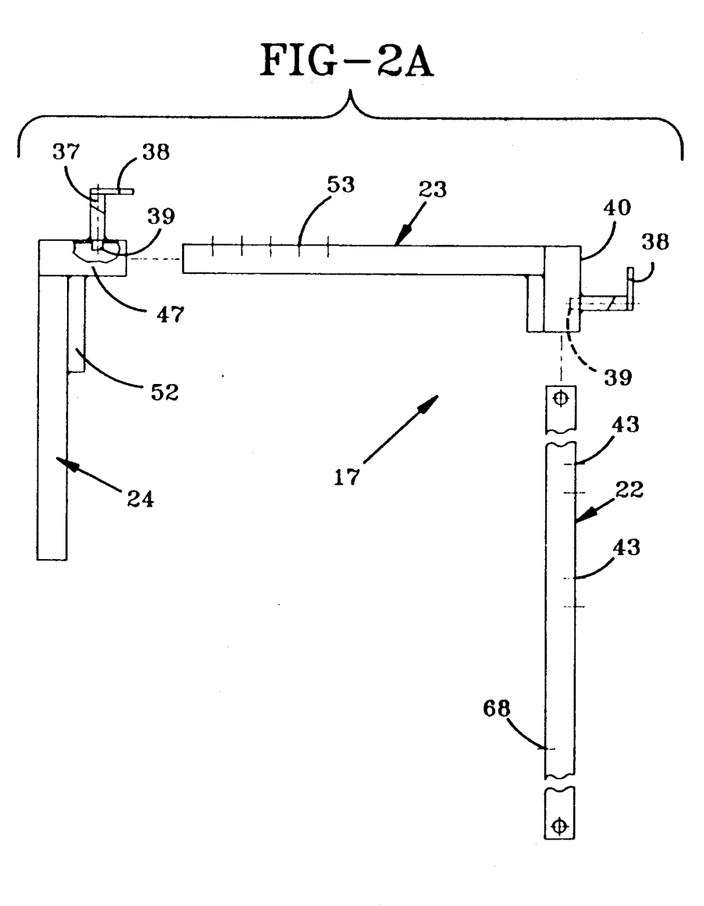
FIG. 2A is a top plan view similar to FIG. 2, showing the three rigid bars in an unassembled condition, which form the cradle for the front wheel of the motorcycle.

Referring particularly to FIGS. 2 and 2A, adapter kit 15 includes a pair of wheel retainers or cradles, indicated generally at 16 and 17. Cradle 16 is intended to capture the rear wheel of a motorcycle and is comprised of three rigid bar members which include a cross tube attachment bar 18, a cross bar 19 and a retainer bar 20. Cradle 17 is intended for capturing the front wheel of the motorcycle and also includes three rigid bar members, namely, a cross tube attachment bar 22, a cross bar 23 and a retainer bar 24. The components of each of these cradles are similar to each other except that the lengths of attachment bars 18 and 22 will vary, as well as the lengths of retainer bars 20 and 24. Preferably, cross bars 19 and 23 are identical thereby reducing the number of component parts for each adapter kit.

Figure 3:
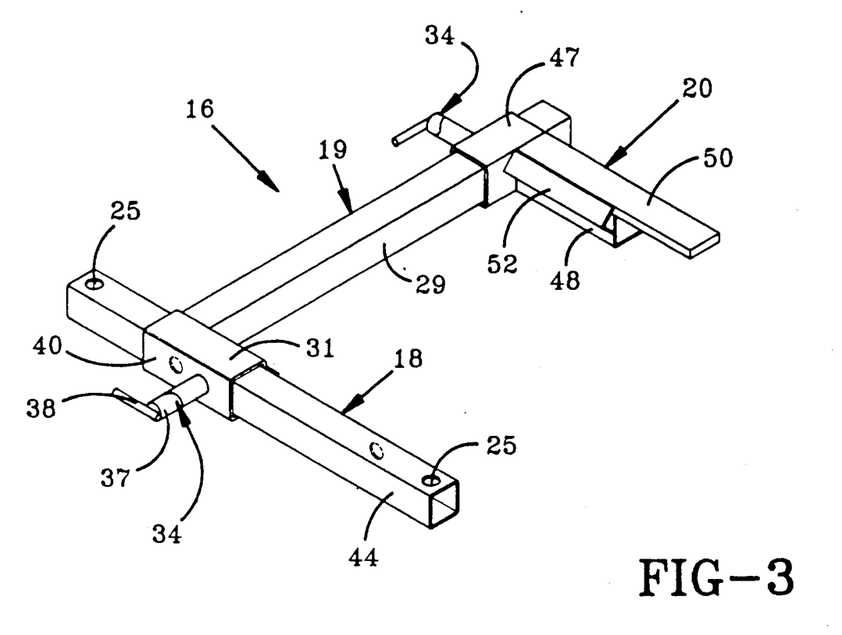
FIG. 3 is a perspective view of the rear wheel cradle forming bars in an assembled position, detached from the cross tube assembly of the tow vehicle.
Figure 4:
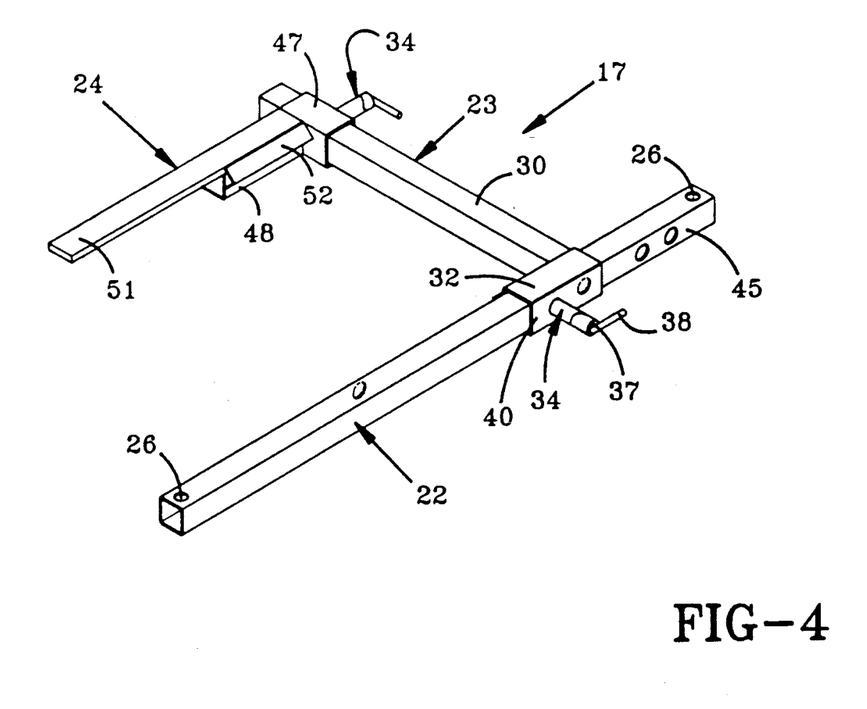
FIG. 4 is a perspective view of the front wheel cradle forming bars of FIG. 2A in an assembled position, detached from the cross tube assembly of the tow vehicle.

FIGS. 3 and 4 show the component bars of FIGS. 2 and 2A, respectively, in assembled condition. Attachment bars 18 and 22 preferably are formed of hollow box-tube members having a generally rectangular cross-sectional configuration. Holes 25 and 26 are formed in both ends of bars 18 and 22, respectively, for receiving hooks 65 of flexible securement straps 63 and 66 as discussed further below and shown in FIG. 7. Cross bars 19 and 23 preferably are identical, and hollow rectangular bars 29 and 30 may be similar in shape and size to that of attachment bars 18 and 22. A pair of mounting sleeves 31 and 32 consisting of short sections of rectangular shaped tubing, preferably are secured by welding to an end of bars 29 and 30, and have hollow interiors complementary for slidably receiving the attachment bars therein. Quick release locking pin assemblies 34 are mounted on sleeves 31 and 32, and preferably are of a type well known in the art. Pin assemblies 34 usually will contain a spring biased pin 39 (FIGS. 2 and 2A) mounted inside of an outer sleeve, an upper portion 37 of which is cam actuated by a lever 38, for moving pin 39 through an aligned hole formed in a side wall 40 of sleeves 31 and 32 and through one of a plurality of holes 42 and 43 formed in attachment bars 18 and 22, respectively.

Retaining bars 20 and 24 are similar, each having a box-shaped sleeve 47 welded to the end of a short section of box-shaped support tube 48, and with a locking pin assembly 34 mounted on sleeve 47. Flat retainer bar plates 50 and 51 are secured, preferably by welding, to support tubes 48 and extend outwardly therefrom generally parallel with and spaced from attachment bars 18 and 22, respectively. An angle iron 52 (FIGS. 3, 4 and 6) is secured preferably by welding, to each sleeve 47, to each support tube 48 and to plates 50 and 51 of the retainer bars. Locking pins 39 of locking pin assemblies 34, likewise are adapted to extend through aligned holes formed in a side wall 41 of each sleeve 47 and project into one of a plurality of holes 53 formed in the side walls of bars 29 and 30, respectively, for securing retainer bars 20 and 24 in an adjusted position.

As shown particularly in FIGS. 3 and 4, cross bars 19 and 23 extend in an orthogonal direction with respect to their associated attachment bar 18 and 22, with retainer plates 50 and 51 extending in an orthogonal, outwardly direction, with respect to their respective cross bars 19 and 23.

Figure 5:
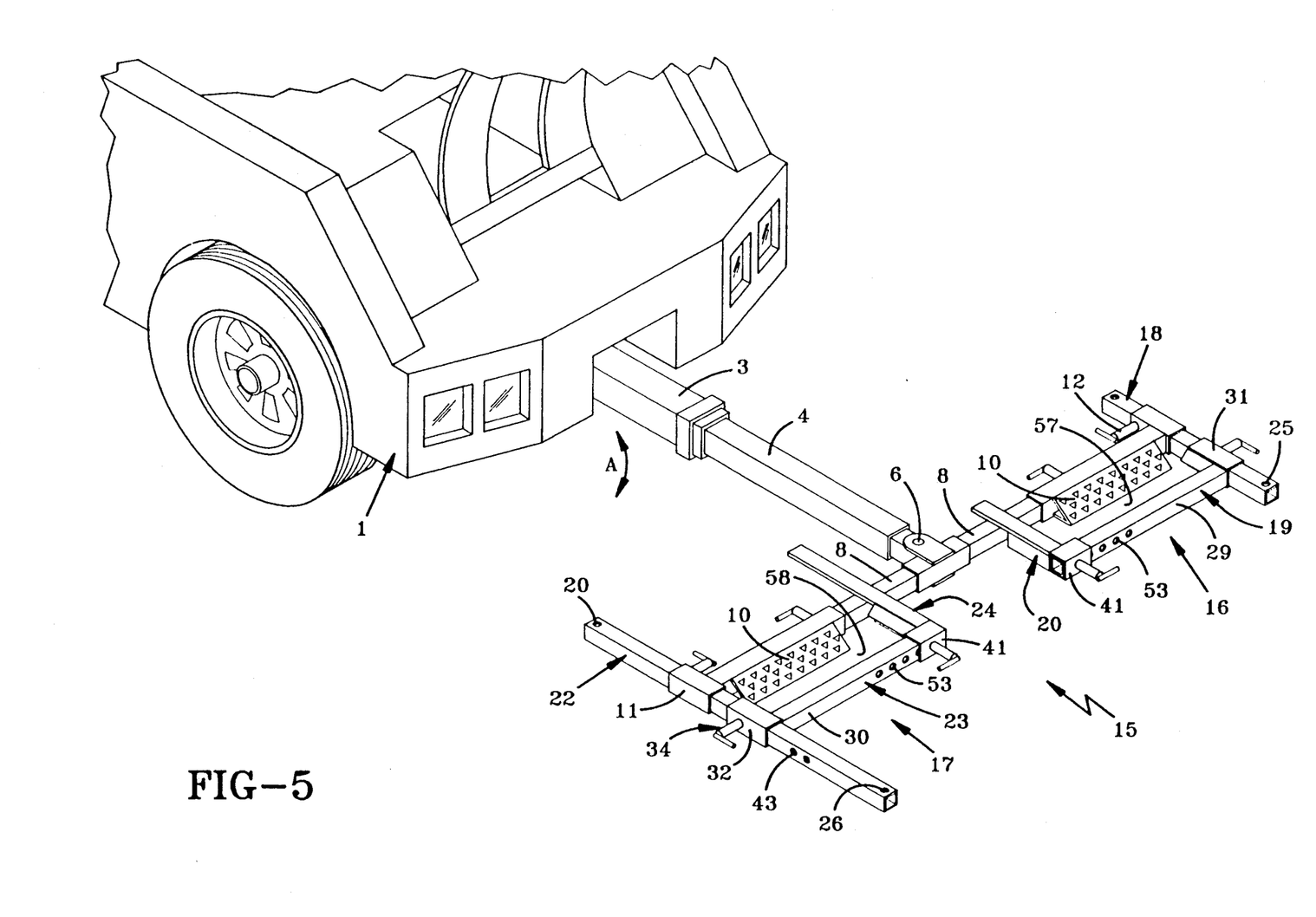
FIG. 5 is a perspective view showing the adapter kit in an assembled position on the cross tube assembly of the vehicle wheel lift.
Figure 6:
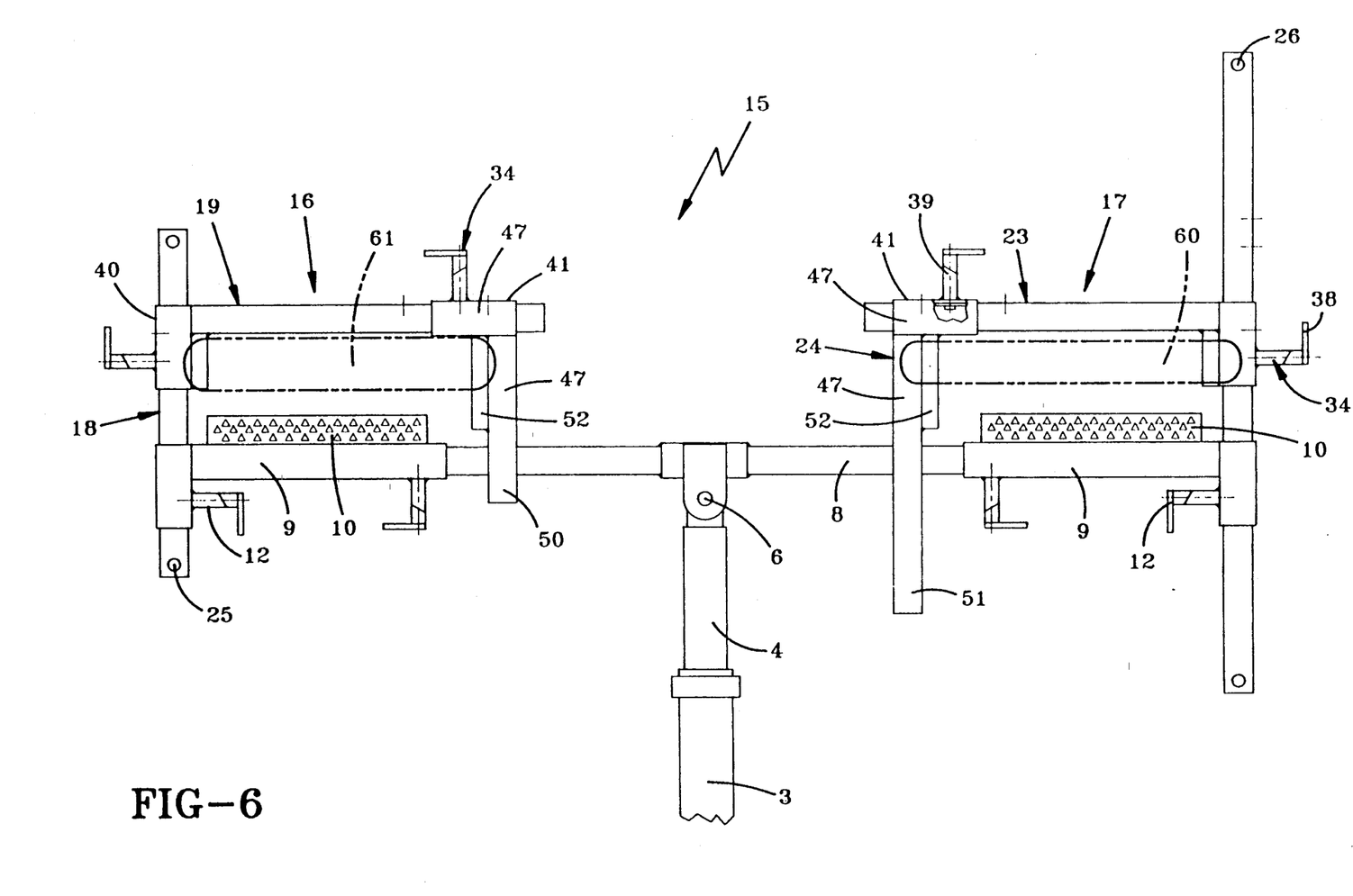
FIG. 6 is an enlarged top plan view of the adapter kit mounted on the cross tube assembly of the wheel lift with the motorcycle wheels shown in dot-dash lines in position in the spaced cradles of the kit.

This orthogonal mounting arrangement of the three rigid bars when mounted on cross tube assembly 5 form the box-like cradles 16 and 17 as shown in FIGS. 5 and 6, having rectangular-shaped openings 57 and 58 therein. When in this assembled position, retainer bar plates 50 and 51 of retainer bars 20 and 24 extends across and are supported on cross tube arm 8.

Figure 7:
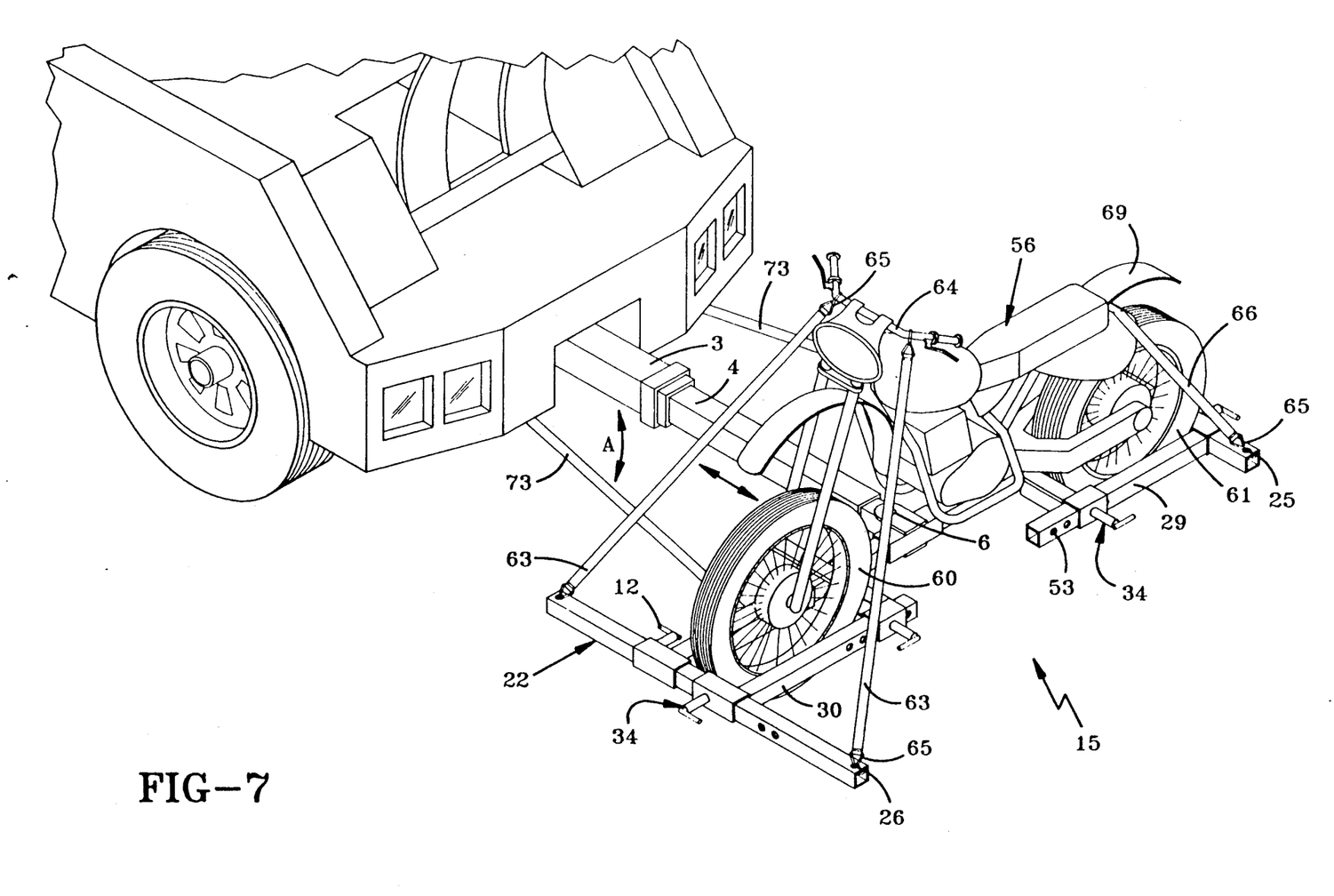
FIG. 7 is a diagrammatic perspective view showing a motorcycle supported by the adapter kit of the invention on the wheel lift of a tow vehicle.

The manner of operation of adapter kit 15 is best understood by referring to FIGS. 5, 6 and 7. An operator upon reaching the site of a disabled motorcycle 56 will position cross tube assembly 5 generally adjacent to and along the length and side of the motorcycle, which preferably is in an upright position, supported by both wheels 60 and 61. Next, the operator will slidably mount attachment bars 18 and 22 in mounting sleeves 11 on the ends of cross tube assembly 5, with locking pins 12 engaging holes 67 and 68 formed in attachment bars 18 and 22, respectively. If necessary, the position of support arms 9 of cross tube assembly 5 will be adjusted nd locked in position by other lock assemblies 12 (FIG. 1).

Next, the operator will mount cross bars 19 and 23 on attachment bars 18 and 22, respectively, advancing sleeves 31 and 32 along bars 18 and 22 until cross bars 19 and 23 are closely adjacent to the outside portion of front and rear motorcycle wheels 60 and 61. Afterwhich retainer bars 20 and 24 are mounted on cross bars 19 and 23, respectively, by locking pins 39 being engaged in a selected hole 53 formed therein, forming the box-like cradle shown particularly in FIGS. 5 and 6. Thus, both wheels are trapped within cradle openings 57 and 58 and upon raising of cross tube assembly 5 by the hydraulic movement of outer boom 3 and boom extension arm 4, the motorcycle wheels will settle into openings 57 and 58 and generally rest upon angles irons 52 of cross bars 19 and 23 and of retainer bars 20 and 24.

One or more flexible straps 63, preferably are connected to handle bars 64 of the motorcycle or other sturdy attachment location by hooks 65, with the hooks on the opposite ends of the straps extending into holes 26 formed in the ends of attachment bar 22. Next, one or more flexible straps 66 are connected by hooks 65 into end holes 25 formed in attachment bar 18 of the rear wheel cradle 16 and are secured to another attachment point or frame component on the rear of the motorcycle for retaining it in the cradles. After the motorcycle has been raised a slight distance off the ground so that the wheels are fully seated within the cradle openings, the straps are tightened to firmly retain the motorcycle within the spaced cradles.

After securing the motorcycle in front and rear cradles 16 and 17 by straps 63 and 66, extension arm 4 is retracted into outer boom 3 which is then moved to a fully raised position for transporting the motorcycle to a desired location. If the wheel lift is of the type in which cross tube arm 8 is not secured from pivoting around mounting 6 when arm 4 is in a fully retracted position, additional straps 73 (FIG. 7) may extend between arm 8 and tow vehicle 1 to prevent arm 8 from pivoting.

According to the invention, a single operator can easily and conveniently, and in a relatively short period of time, assemble the three rigid bars of each cradle adjacent to the motorcycle, which preferably is in an upright position, and adjust the location of the various bars with respect to each other and to the cross tube assembly of the wheel lift, to match the particular frame and wheel size of the particular motorcycle to be transported by the tow vehicle. Furthermore, the motorcycle is completely retained within the spaced wheel cradles and secured by flexible straps to the cradle forming bars, without requiring use of a usual tow vehicle sling 70 and its connecting cables 71, which many times are unusable due to the accessories mounted on the motorcycle since it would damage and mar the accessory.

Accordingly, the adapter kit is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved adapter kit is constructed and used, the characteristics of the construction, and the advantageous, new and useful results obtained; the new and useful structures, devices, elements, arrangements, parts and combinations, are set forth in the appended claims.

I claim:

1. An adapter kit for attachment to a wheel lift of a vehicle of the type having an extension arm extending outwardly from the vehicle generally aligned with the longitudinal centerline of the vehicle and a cross tube mounted on said extension arm generally orthogonal thereto for transporting a motorcycle having an upper frame portion and a pair of spaced apart wheels, in a generally lateral direction with respect to the longitudinal centerline of the vehicle, said kit including:

a) a pair of wheel cradles adapted to be mounted in a spaced relationship on the cross tube laterally with respect to said longitudinal centerline of the vehicle, for supporting the wheels of the motorcycle therein, each of said cradles having an attachment bar, first means adapted to be secured on the cross tube for mounting the attachment bar thereon whereby said attachment bar projects from the cross tube, a cross bar, second means for mounting the cross bar on the attachment bar whereby said cross bar extends generally orthogonal from the attachment bar toward the other of the cradles and adapted to be generally parallel with the cross tube, a retainer bar, third means for mounting the retainer bar on the cross bar whereby said retainer bar extends generally parallel with and spaced from the attachment bar and forms an opening in combination with the cross bar, attachment bar and cross tube when the cradle is mounted on said cross tube for receiving and supporting one of the spaced wheels of the motorcycle; and securing means for securing the upper frame portion of the motorcycle to at least one of the attachment bars at spaced apart locations on said one attachment bar, with the cross tube being intermediate said two attachment locations when the attachment bar is mounted on said cross tube.

2. A kit as defined in claim 1 in which each of the attachment bars is adapted to be slidably adjustably mounted on an existing end of the vehicle cross tube by the first means.

3. A kit as defined in claim 1 in which each of the attachment bars utilizes a hollow tube, rectangular in cross-sectional configuration.

4. A kit as defined in claim 1 in which each of the cross bars is slidably adjustably mounted on the attachment bar by the second means.

5. A kit as defined in claim 4 in which each of the second means includes a quick release locking pin for mounting each of the cross bars.

6. A kit as defined in claim 1 in which each of the retainer bars is slidably adjustably mounted on the cross bar by the third means.

7. A kit as defined in claim 6 in which each of the third means includes a quick release locking pin for mounting each of the retainer bars to its cross bar.

8. A kit as defined in claim 1 in which each of the retainer bars includes a lower support tube and a generally flat upper retainer plate; and in which an extended end of said retainer plate is adapted to be supported by the cross tube of the wheel lift.

9. A kit as defined in claim 8 in which an angled wheel support plate is attached to each of the retainer bars and extends towards the attachment bar of its respective cradle for engaging the wheel of the motorcycle.

10. A kit as defined in claim 1 in which the securing means includes a flexible strap connected to each of the attachment bars.

11. A kit as defined in claim 10 in which the straps have ends; and in which hooks are mounted on said strap ends and are engaged in holes formed in the attachment bars for securing the straps to said attachment bars.

12. A kit as defined in claim 1 in which each of the second and third means has a receiver sleeve for adjustably slidably mounting the cross bars on their respective attachment bars and the retainer bars on their respective cross bars.

13. A kit as defined in claim 12 in which each of the sleeves includes a locking pin which is selectively received within an aligned hole formed in the particular attachment bar or cross bar associated with said sleeve.

14. A kit as defined in claim 1 in which each of the second means includes a hollow sleeve extending generally orthogonally from an end of each of the cross bars; and in which the respective attachment bar is slidably received in said sleeve and retained in a selected position by a locking pin.

15. A carrier for a motorcycle of the type having a pair of spaced wheels and an upper portion, in combination with a laterally extending cross member of a movable lift of a vehicle, said carrier including a pair of separate independently adjustable wheel supporting cradles mounted on the cross member in a laterally spaced relationship with respect to a longitudinal centerline of the vehicle for receiving and supporting the spaced wheels of the motorcycle therein; each of said cradles including an attachment bar, first means for mounting the attachment bar in a general orthogonal relationship on the cross member; a cross bar, second means for mounting the cross bar on the attachment bar in a generally spaced parallel relationship with the cross member; a retainer bar, third means adjustably mounting the retainer bar on the cross bar in a general orthogonal relationship whereby said attachment bar, cross bar and retainer bar form a generally rectangular shaped structure with the cross member, and form an opening therebetween for receiving a portion of one of the motorcycle wheels therein to support said wheel on said structure, one of said first and second mounting means adjustably mounting the cross bar with respect to the cross member to vary the spacing therebetween independent of the spacing between the cross bar and cross member of the other cradle; and strap means extending between the upper portion of the motorcycle and at least one of the cradles for stabilizing the motorcycle in said cradles.

16. The combination defined in claim 15 in which a sleeve is attached to an end of each of the cross bars and retainer bars and extend generally orthogonal thereto for slidably receiving the attachment bars and cross bars respectively therein, for adjustably mounting the cross bars on the attachment bars and the retainer bars on the cross bars.

17. The combination defined in claim 16 in which a lock pin extends through aligned holes formed in each of the sleeves and the associated attachment bar and cross bar for securing the cross bars and retainer bars in selected adjusted positions on their respective attachment bars and cross bars.

* * * * *